Aug. 27, 1963 F. WEBER 3,101,926
VARIABLE AREA NOZZLE DEVICE
Filed Sept. 1, 1960 2 Sheets-Sheet 1

INVENTOR:
FRITZ WEBER,
BY J. Thomas Eubanks
Attorney.

Aug. 27, 1963  F. WEBER  3,101,926
VARIABLE AREA NOZZLE DEVICE
Filed Sept. 1, 1960  2 Sheets-Sheet 2

INVENTOR:
FRITZ WEBER,
BY J. Thomas Cubanks
Attorney.

United States Patent Office 3,101,926
Patented Aug. 27, 1963

3,101,926
VARIABLE AREA NOZZLE DEVICE
Fritz Weber, Los Angeles, Calif., assignor to The Garrett Corporation, Los Angeles, Calif., a corporation of California
Filed Sept. 1, 1960, Ser. No. 53,546
4 Claims. (Cl. 253—78)

This invention relates generally to variable area nozzles, and has particular reference to a variable area nozzle for fluid turbines of the radial inflow type.

In order to maintain reasonably constant efficiency in fluid turbines under varying operating conditions, it is common practice to provide a variable area nozzle device around the periphery of the entrance to the turbine. In turbines of the radial inflow type the variable area nozzle device customarily comprises a plurality of air-foil shaped nozzle vanes disposed in a nozzle passage at the entrance of the turbine and arranged to be tilted or pivoted to vary the effective nozzle area.

In the above noted type of variable area nozzle device sufficient clearance must be provided between the vanes and the walls of the nozzle passage so that free movement of the vanes is permitted during all stages of operation. Since the temperature of the fluid flowing to the turbine may vary considerably, the clearance between the vanes and the walls of nozzle passage during normal operation may be relatively large. This clearance permits the driving fluid flowing to the turbine to flow or leak between the vanes and the walls of the nozzle passage. The direction of flow of air which leaks between the vanes and the walls of the nozzle passage is at an angle to the direction of flow of the turbine driving fluid flowing through the nozzle vanes. This leakage, therefore, affects the efficiency of the turbine during all stages of operation but especially when the vanes are in the somewhat more closed position associated with normal operation.

Accordingly, it is an object of the present invention to provide an improved variable area nozzle device of the aforementioned type that prevents leakage of fluid between the nozzle vanes and the walls of the nozzle passage.

It is another object of the invention to provide a variable area nozzle device comprising a plurality of pivotal nozzle vanes having sealing means to prevent leakage of fluid between the nozzle vanes and the walls of the nozzle passage.

It is still another object of the invention to provide a variable area nozzle device comprising a plurality of pivotal nozzle vanes having means actuated by the driving fluid flowing to the turbine to engage the walls of the nozzle passage to prevent leakage of the fluid between the nozzle vanes and the walls of the nozzle passage.

Other objects and features of the invention will be more apparent to those skilled in the art from the following detailed description of a preferred embodiment taken in conjunction with the accompanying drawings in which.

Figure 1:
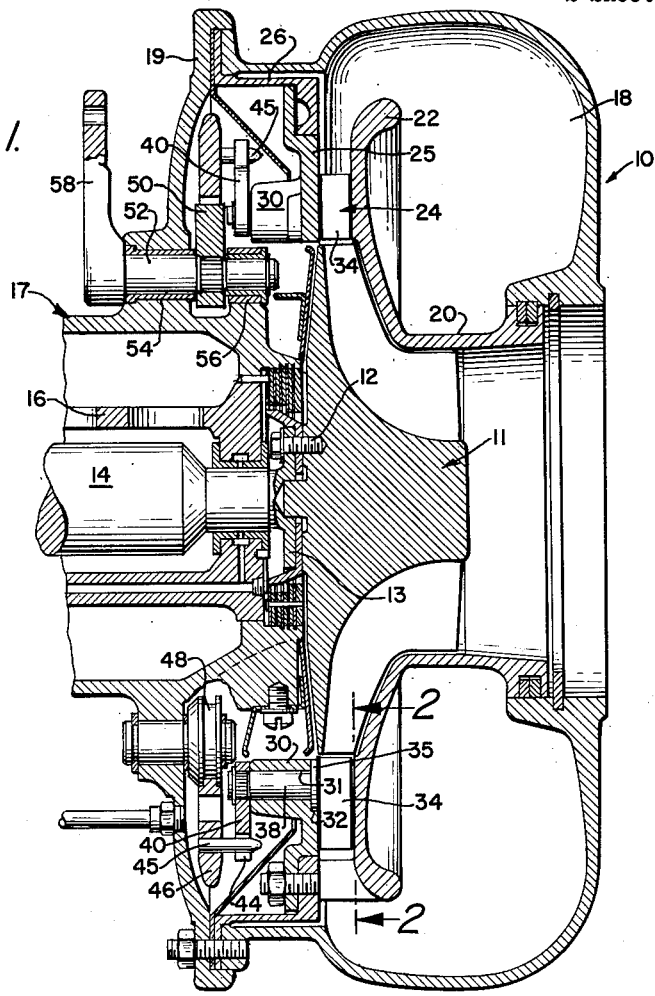
FIG. 1 is a longitudinal section through a turbine having a variable area nozzle embodying the invention.

Referring to FIG. 1 of the drawings, there is shown a turbine 10 having a radial inward flow or centripetal turbine rotor 11 fastened by means of bolts 12 to a mounting flange 13 secured or formed on the end of a shaft 14. The shaft is rotatably supported by bearings mounted in a carrier 16 forming a portion of a housing 17.

Located at the periphery of the turbine motor 11 is an inlet plenum chamber 18 secured to a flange 19 formed on the housing 17. A shroud 20 is positioned about the periphery of the blades of the rotor 11 and is provided with an axial extension 22, the extension 22 forming one wall of a passage housing a variable area nozzle, indicated generally at 24.

A mounting arrangement for the variable area nozzle 24 is provided by means of an annular plate or wall 25 which is secured to the housing 11 by a mounting ring 26. The plate 25 is provided with a plurality of axially extending circumferentially spaced bosses 30, each boss being provided with an axial bore 31 and a circular recess 32.

Figure 2:
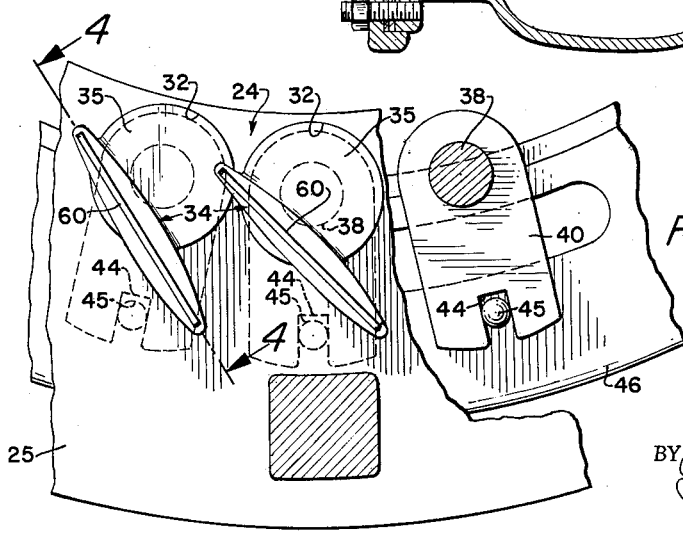
FIG. 2 is an enlarged fragmentary sectional view taken substantially on line 2—2 of FIG. 1 and showing a portion of the nozzle vane construction of the present invention and the actuating means therefor.
Figure 3:
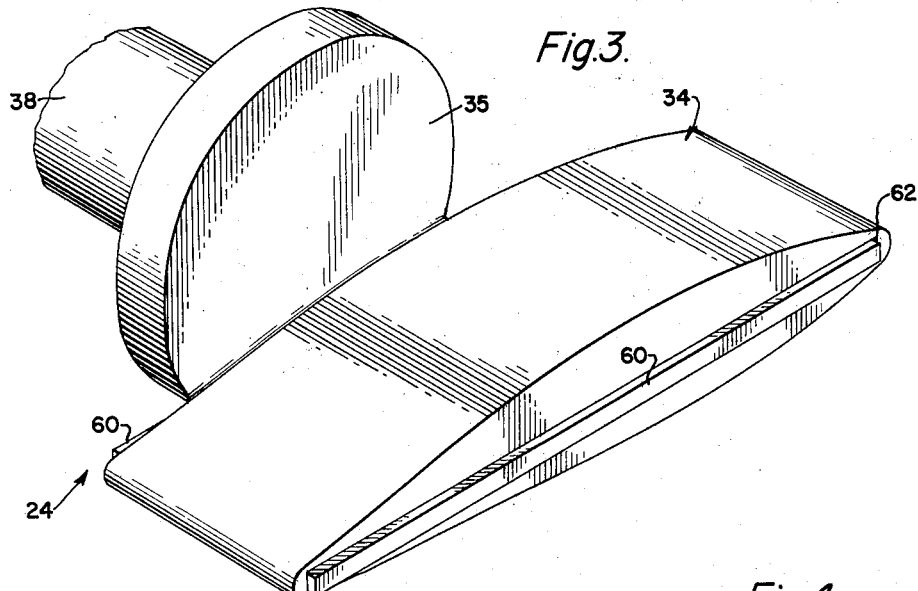
FIG. 3 is an enlarged fragmentary perspective view of one of the nozzle vanes and the support means therefor.

As shown in FIGS. 2 and 3, the variable area nozzle 24 comprises a plurality of air-foil shaped nozzle vanes 34 which are secured to or formed on the face of disks 35 and offset radially from the axis of the disk. Each of the disks 35 is provided with an axially extending shaft 38, the several shafts being adapted to be journaled in the bores 31 formed in the bosses 30. Each of the shafts 38 extends axially beyond the bosses 30 and is provided with a lever 40 secured thereto by suitable fastening means. The levers 40 extend substantially radially outwardly from the shafts 38 and are provided with radially extending slots 44 in the outer end thereof. The slots 44 are adapted to receive pins 45 which extend axially thereto from a nozzle actuating ring 46.

The actuating ring 46 is adapted to be rotated about and to ride upon rollers 48 by means of a lever 50 which engages a notch in the inner periphery of the ring 46. The lever 50 is secured to a shaft 52 journaled in bearings 54 and 56. A lever 58 is secured to the outer end of the shaft 52 and is adapted to rotate the ring 46 through the medium of the lever 50. Rotation of the ring 46 will act through the pins 45 to move the levers 40 and thereby rotate the shafts 38 and the vanes 34. Rotation of the vanes 34 will either increase or decrease the effective area of the nozzle 24 defined by the spaces intermediate the vanes 34 and the opposed surfaces of the walls 22 and 25.

The above described portion of the turbine is shown as similar in construction to the one disclosed in U.S. Patent No. 2,860,827 issued on November 18, 1958 to H. Egli and reference is made to that patent for a more detailed description of the turbine.

As previously noted, the vanes 34 are dimensioned in width so that they have clearance of the nozzle walls when fully expanded and at maximum temperature. Since there is considerable difference between the maximum temperature of the driving fluid and the temperature of the fluid at normal operating conditions, a relatively large clearance exists between the vanes and the walls of the nozzle passage during normal operation of the turbine. Leakage of turbine driving fluid through the clearance between the vanes and the walls of the nozzle passage during normal operation considerably lowers the efficiency of the turbine. For example, it has been estimated that if the leakage through the above described clearance is prevented, the efficiency of the turbine component of a turbocompressor operating under normal conditions at 30,000 feet cruise altitude can be increased from 46% to 71%. This improvement would result in reduced bleed air extraction from the main engine compressor, with a very significant fuel saving.

Figure 4:
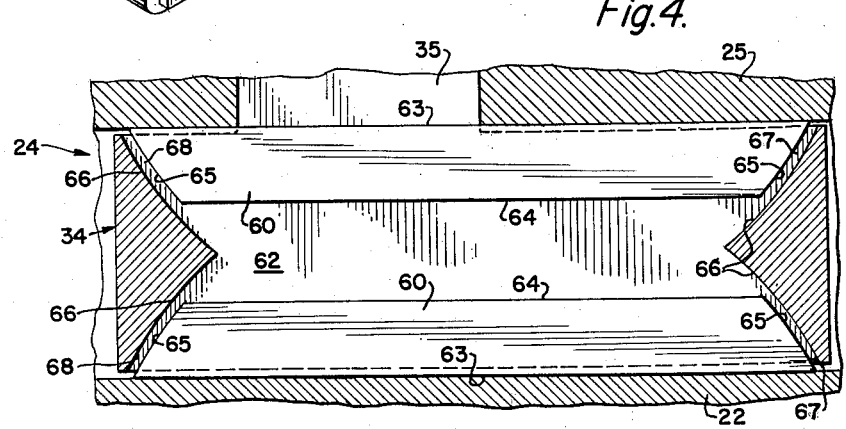
FIG. 4 is a sectional view taken on line 4—4 of FIG. 2.

As shown in FIG. 4, the means provided to prevent leakage of the driving fluid between the nozzle vanes 34 and the walls of the nozzle passage comprise a pair of blades 60 disposed in a slot 62 formed in the vanes 34 and the adjacent annular disks 35. The blades 60 are shown as having substantially parallel sides 63 and 64 and arcuate ends 65 but it is to be understood that blades having variations of this form may be used. The slots 62 have ends 66 spaced apart and formed to receive the blades 60.

The sides 63 of the blades are arranged so that they fully contact the adjacent wall of the nozzle passage when the blades are forced outwardly. The length of the blades 60 is selected so that when the blade is centered in the slot interstices 67 and 68 exist at the upstream and downstream ends of the slot. When fluid flows through the nozzle passage to the turbine, the high pressure fluid at the leading edge of the vane enters the interstice 67 and forces the blades 60 to the left as shown in FIG. 4. Thus the interstice 68 at the downstream end of the vane is substantialyl closed while the interstice 67 forms a passage through which the high pressure fluid flows to the space between the blades. The high pressure fluid acting on the sides 64 of the blades tends to move the blades outwardly so that the sides 63 contact the adjacent nozzle walls. The outward movement of the blades is augmented by the suction or Bernoulli effect of any slight leakage of fluid through the minimal clearance between the sides 63 of the blades and the nozzle wall.

It is evident that the blades 60, being long and narrow and having freedom of endwise movement in their slots 62, could conceivably become canted and wedged in the slots if the slot end walls 66 were parallel. This possibility of the blades becoming wedged is obviously avoided by the illustrated divergence of the slot end walls and the correspondingly curved or beveled ends on the blades.

The passages which connect the space between the blades at the interior of the vanes with the region of high pressure at the leading edge may be arranged otherwise than as shown in FIG. 4. For example, a drilled passage may be provided through the central portion of the upstream or leading edge of the vane 34 into the space between the blades 60. When the passage is thus located in the leading edge of the vanes the high pressure fluid has access directly into the space between the blades. As in the example cited above, the high pressure fluid on the sides 64 of the blades and the suction or Bernoulli effect at the sides 63 of the blades tends to cause the blades to move outwardly so that the sides 63 contact the adjacent walls 22 and 25 of the nozzle passage.

Figure 5:
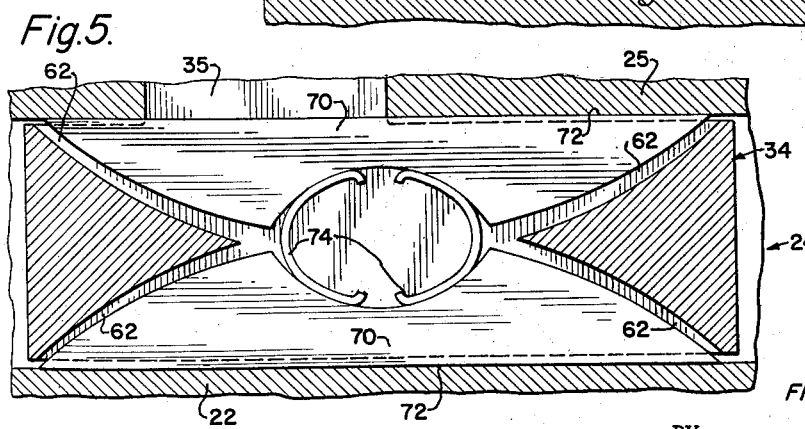
FIG. 5 is a sectional view similar to FIG. 4 and showing a modified form of the invention.

In FIG. 5 a modification of the vane construction is shown wherein the means provided to prevent leakage of the driving fluid between the nozzle vanes 34 and the walls of the nozzle passage comprise a pair of blades 70 disposed in the slot 62 formed in the vane 34 and the adjacent annular disk 35. The blades 70 substantially comprise two arcuate segments having their arcs oppositely disposed, each of the blades having a straight side 72 arranged to fully contact the adjacent wall of the nozzle passage when the blades are forced outwardly, and an arcuate side provided with a recess to receive resilient means such as springs 74. The springs 74 are arranged in the slot between the blades 70 and functions to urge the sides 72 of the blades into engagement with the adjacent walls 22 and 25 of the nozzle passage to prevent leakage of the driving fluid between the nozzle vane and the sides of the nozzle passage.

While the invention is described and has particular utility for use with fluid turbines of the radial inflow type, it is to be understood that its utility is not limited thereto but may be utilized in many other applications, as will be apparent to those skilled in the art.

I claim:

1. A variable area nozzle for controlling the flow of a fluid from an inlet plenum to a point of use, comprising: means defining a passageway having a pair of spaced, substantially parallel walls for directing the fluid from the inlet plenum to the point of use; a plurality of adjustable nozzle vanes rotatably mounted in said passageway for controlling flow therethrough and each having a leading edge and a trailing edge with respect to the direction of fluid flow thereover, each of said vanes also having opposite side edges disposed in adjacent, confronting relation to said walls of said passageway; there being longitudinally extending slots with end walls in each nozzle vane disposed in a plane substantially normal to and opening through said side edges of the respective vane; blades slidably disposed in and confined in the endwise direction between the end walls of said slots in each nozzle vane; and there being fluid passage means communicating said slots in each nozzle vane inwardly of its respective blades to said passageway at the leading edges of the vanes, whereby said blades in each nozzle vane are urged outwardly by fluid pressure into fluid sealing contact with said walls of said passageway.

2. A variable area nozzle for controlling the flow of a fluid from an inlet plenum to a point of use, comprising: means defining a passageway having a pair of spaced, substantially parallel walls for directing the fluid from the inlet plenum to the point of use; a plurality of adjustable nozzle vanes rotatably mounted in said passageway for controlling flow therethrough and each having a leading edge and a trailing edge with respect to the direction of fluid flow thereover, each of said vanes also having opposite side edges disposed in adjacent, confronting relation to said walls of said passageway; there being longitudinally extending slots with end walls in each nozzle vane disposed in a plane substantially normal to and opening through said side edges of the respective vane; blades slidably disposed in and confined in the endwise direction between the end walls of said slots in each nozzle vane; and the length of said blades being slightly less than the length of said slots, whereby said blades are urged in the endwise direction into contact with one end wall of their respective slots by the fluid pressure at the leading edges of said nozzle vanes, thereby to communicate the slots in each vane inwardly of its respective blades to said passageway at the leading edges of said vanes via flow spaces between the other end walls of said slots and the adjacent ends of said blades, and said blades in each nozzle vane are urged outwardly by fluid pressure into fluid sealing contact with said walls of said passageway.

3. A variable area nozzle for controlling the flow of a fluid from an inlet plenum to a point of use, comprising: means defining a passageway having a pair of spaced, substantially parallel walls for diirecting the fluid from the inlet plenum to the point of use; a plurality of adjustable nozzle vanes rotatably mounted in said passageway for controlling flow therethrough and each having a leading edge and a trailing edge with respect to the direction of fluid flow thereover, each of said vanes also having opposite side edges disposed in adjacent, confronting relation to said walls of said passageway; there being longitudinally extending slots with end walls in each nozzle vane disposed in a plane substantially normal to and opening through said side edges of the respective vane; blades slidably disposed in and confined in the endwise direction between the end walls of said slots in each nozzle vane; there being fluid passage means communicating said slots in each nozzle vane inwardly of the respective blades to said passageway at the leading edges of the vanes, whereby said blades in each nozzle vane are urged outwardly by fluid pressure into fluid sealing contact with said walls of said passageway; said blades being relatively long in comparison to their width; and said end walls of each slot diverging as the latter approaches its adjacent nozzle vane edge and the ends of each blade being beveled to approximately parallel the end walls, respectively, of its slot to prevent binding of each blade in its slot.

4. A variable area nozzle for controlling the flow of a fluid from an inlet plenum to a point of use, comprising: means defining a passageway having a pair of spaced, substantially parallel walls for directing the fluid from the inlet plenum to the point of use; a plurality of adjustable nozzle vanes rotatably mounted in said passageway for controlling flow therethrough and each having a leading edge and a trailing edge with respect to the direction of fluid flow thereover, each of said vanes also having opposite side edges disposed in adjacent, confronting relation to said walls of said passageway; there being longitudinally extending slots with end walls in each nozzle vane disposed in a plane substantially normal to and opening through said side edges of the respective vane; blades slidably disposed in and confined in the endwise direction between the walls of said slots in each nozzle vane; the length of said blades being slightly less than the length of their respective slots, whereby said blades are urged in the endwise direction into contact with one end wall of their respective slots by fluid pressure at the leading edges of said nozzle vanes, thereby to communicate the slots in each vane inwardly of its respective blades to said passageway at the leading edges of said vanes via flow spaces between the other end walls of said slots and the adjacent ends of said blades, and said blades in each nozzle vane are urged outwardly by fluid pressure into fluid sealing contact with said walls of said passageway; said blades being relatively long in comparison to their width; and said end walls of each slot diverging as the respective slot approaches its adjacent nozzle vane edge and the ends of each blade being beveled to approximately parallel the end walls, respectively, of its slot to prevent binding of each blade in its slot.

References Cited in the file of this patent

UNITED STATES PATENTS

| | | |
|---|---|---|
| 1,685,260 | White | Sept. 25, 1928 |
| 1,688,736 | Moody | Oct. 23, 1928 |
| 1,694,481 | Moody | Dec. 11, 1928 |
| 1,817,654 | Terry | Aug. 4, 1931 |
| 2,860,827 | Egli | Nov. 18, 1958 |
| 2,904,307 | Balje et al. | Sept. 15, 1959 |
| 2,976,013 | Hunter | Mar. 21, 1961 |

FOREIGN PATENTS

| | | |
|---|---|---|
| 702,105 | Great Britain | Jan. 6, 1954 |
| 731,822 | Great Britain | June 15, 1955 |
| 764,121 | Great Britain | Dec. 19, 1956 |
| 783,913 | Great Britain | Oct. 2, 1957 |